Figure 1:
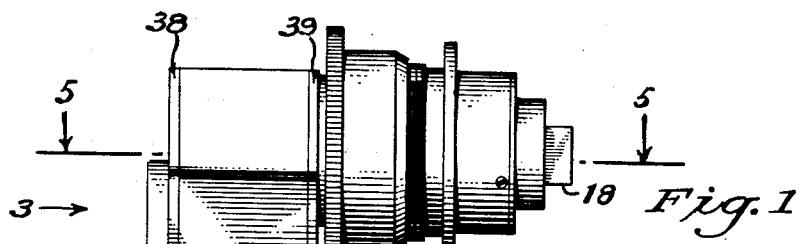

Aug. 4, 1936.                O. C. GILMORE                2,050,223
                        COLOR MOTION PICTURE CAMERA
                        Filed Sept. 5, 1933        3 Sheets—Sheet 1

INVENTOR,
Otto C. Gilmore;
BY
ATTORNEY

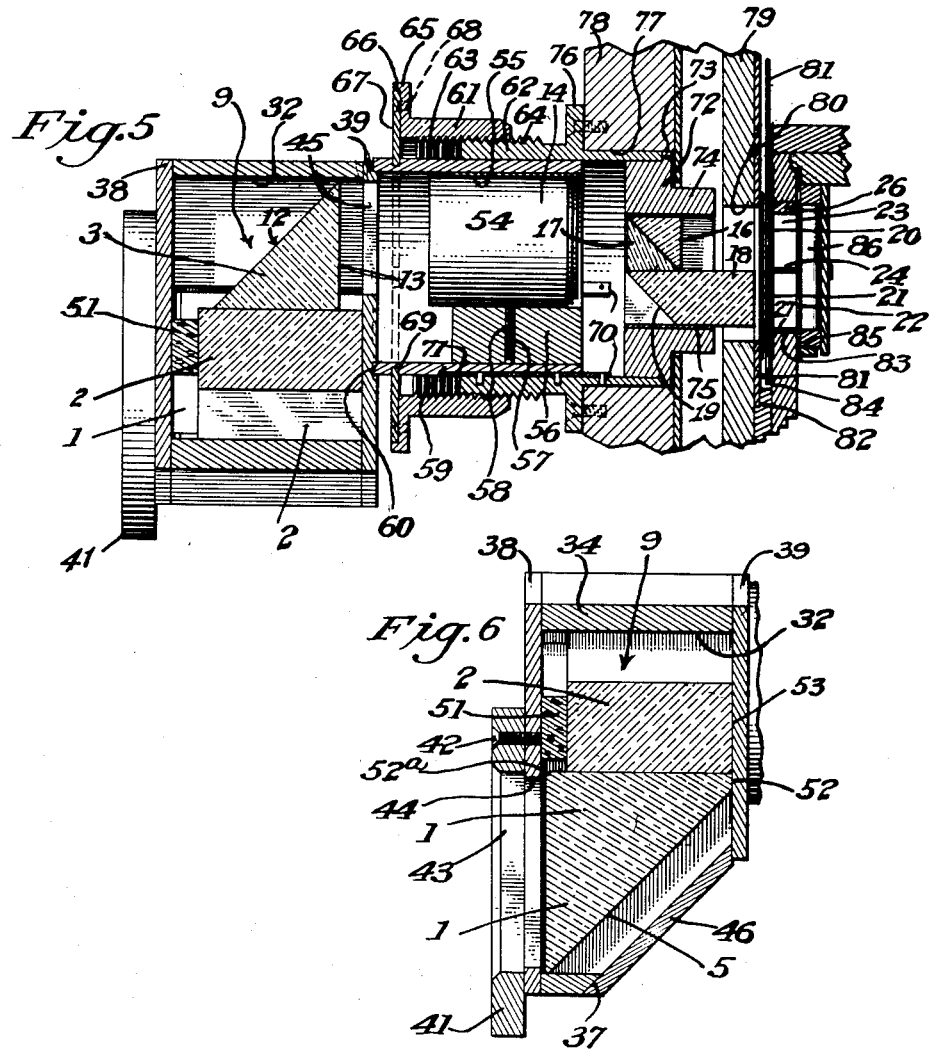

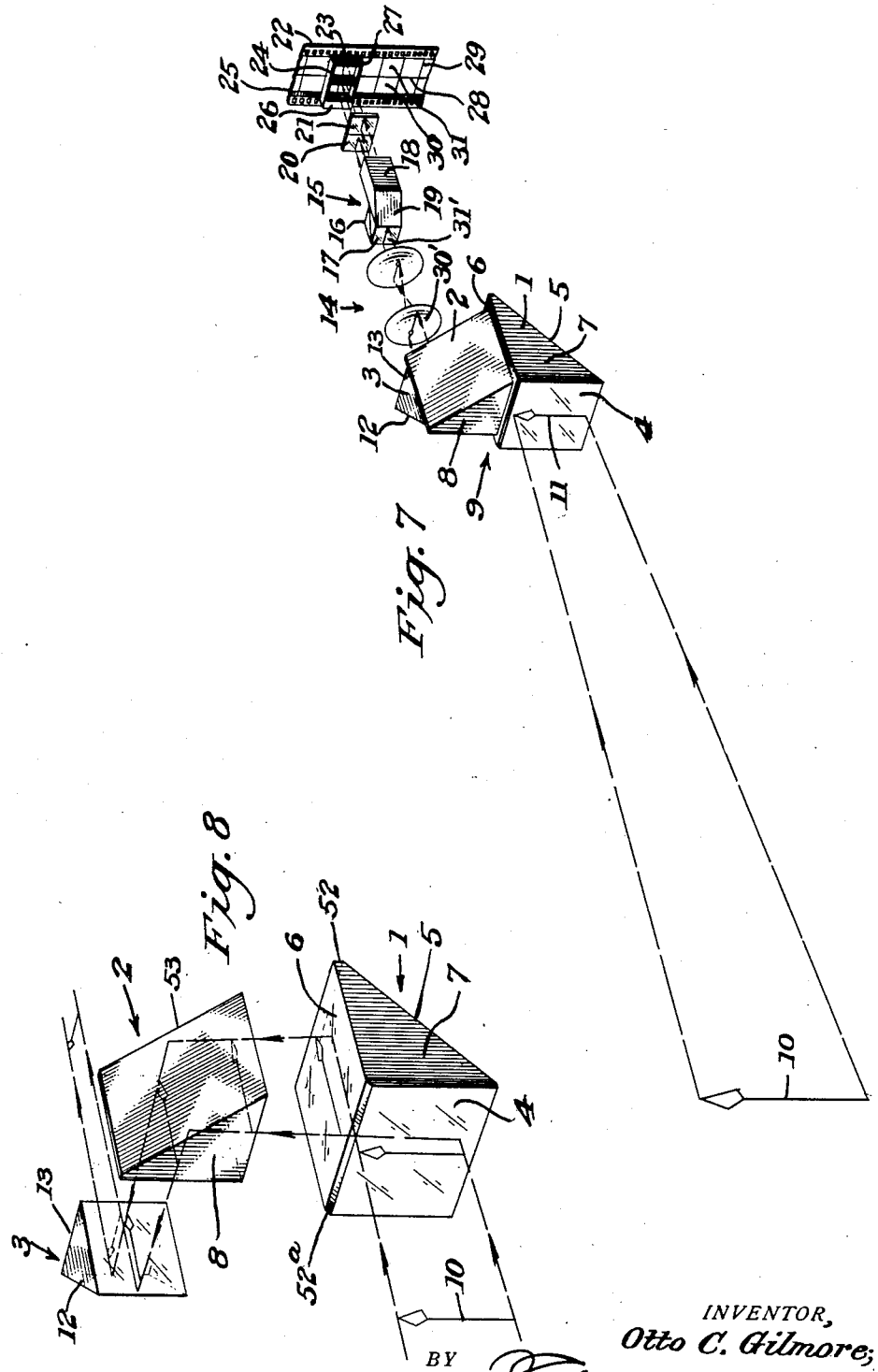

Patented Aug. 4, 1936

2,050,223

UNITED STATES PATENT OFFICE 2,050,223

COLOR MOTION PICTURE CAMERA

Otto C. Gilmore, Los Angeles, Calif., assignor, by mesne assignments, to Cosmocolor Corporation, New York, N. Y., a corporation of Delaware Application September 5, 1933, Serial No. 688,149

5 Claims. (Cl. 88—1)

The present invention relates broadly to cameras, and more specifically to a means which, in one of its embodiments, is adapted to operate in conjunction with a motion picture camera.

The invention has for an object the provision of means adapted to operate in conjunction with a camera, either motion or still, for the purpose of adapting the camera to the photographing of colored objects, without the necessity of introducing a change in the camera construction.

As an example of the above object, and assuming a standard type of motion picture camera adapted to use 35 millimeter film, the device of this invention may be fastened to the lens turret and when the lens is brought into registry with the camera aperture, the camera is adapted to photograph objects on the film by the process known as the subtractive method of color photography.

As is well known in the art, sharpness of detail in the color selection image is often lacking due in part to incorrect focusing, but more often due to loss of light. An object of the present invention is to overcome the defect just mentioned by providing means that will pass the greatest possible amount of effective light, to the end that clear, sharp and distinct photographic images result.

An object of the present invention is to provide suitable means whereby images of an object field may be photographed in such a manner as to provide at least two geometrically identical images so arranged that when the film is treated, the images will always retain the same relationship.

As an example of the above object, it may be stated that the present invention contemplates a device adapted to photograph images of an object field in such a manner as to provide two images within the area or substantial area ordinarily occupied by a single image and in substantially the same proportions.

In the embodiment of the invention to be described, prisms are utilized in a certain relationship with respect to a lens cell. An object of the present invention is to provide a combination utilizing the elements just mentioned in such a manner that light loss through the system is minimized.

Another object consists in the provision of an optical system wherein the number of optical parts are reduced in number and the working parts so arranged that aberrations, astigmatism, distortion, unequal illumination, and other errors are appreciably avoided.

Another object consists in the arrangement of an optical system in such a manner that at least two images of an object field from the same point of view may be photographed simultaneously, the lens of said optical system operating at full aperture of short focal length, the resulting photographic images of the object field being substantially flat.

As an example of the invention, it may be stated that the present invention utilizes trains of reflecting prisms together with a lens in such a manner as to provide two geometrically identical, side-by-side images of an object field, each image having a given color selective value, the result of utilizing what is known as the subtractive method of color photography. This method employs filter mediums. When the photographic image has been properly developed to produce a positive, it has been found that where ordinarily a standard 35 millimeter motion picture film would have a single image on a panel, the present invention has two geometrically identical images to a panel. The two geometrically identical images are projected by special apparatus constituting a companion application for Patent Number 688,150 filed simultaneously with this application for patent, and the projected geometrically identical images are passed through suitable filters by what is known as the additive method, the images being in overlapped relationship. The system is such that the picture on the screen may be accurately registered, a feature of importance.

Another object consists in means adapted to simultaneously photograph two images of an object field in juxta-position and upon a photographic area ordinarily occupied by a single photographic image by the substractive method of color photography, so that there can later be simultaneously projected onto a screen pairs of the photographic images by the additive process of color photography to produce a brilliant, sharply defined picture comparable in said respects aforesaid as to grain with the projection of a single image substantially twice the area of the two images.

Other objects of the invention will be set forth in the detailed description of the invention, among which objects at present may be named, in addition to the ones already set forth, the provision of a photographic system and means for color photography which is simple, inexpensive in cost of manufacture, and adapted to give efficient and superior results.

With the above and other objects in view, the invention consists in the novel and useful provision, formation, construction, association, and interrelation of parts, members, features, and arrangement, all as disclosed in a certain embodiment in the accompanying drawings, described generally, and more particularly pointed out in the claims.

Figure 2:
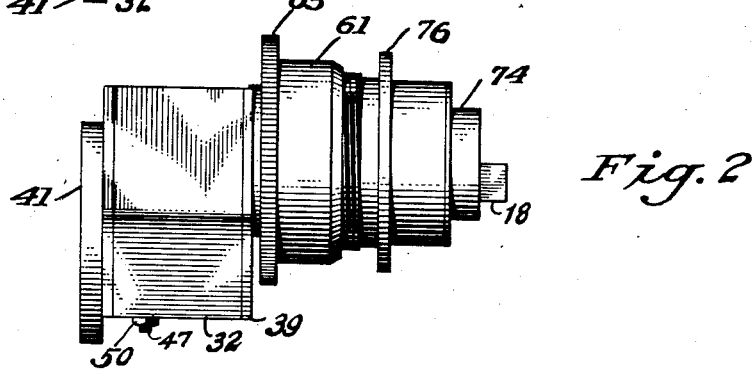
Figure 3:
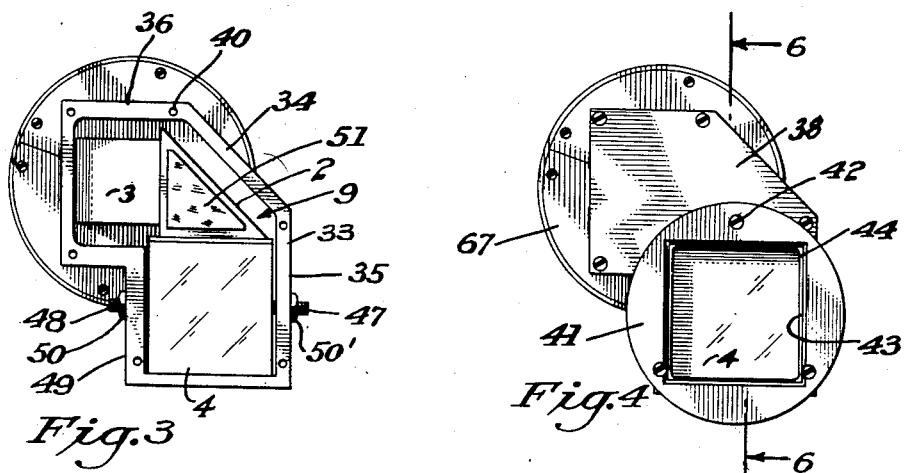
Figure 4:
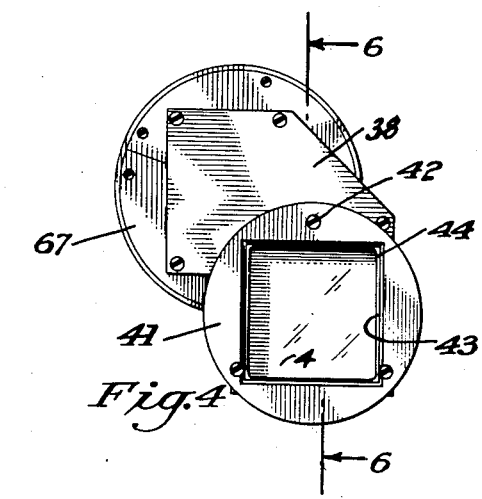

In the drawings:

Figure 1 is a side elevation of the improved attachment adapted to be associated with a camera in practicing color photography, Figure 2 is a top plan view of the device shown in Figure 1, Figure 3 is a front elevation of the device shown in Figures 1 and 2, certain parts being removed, Figure 4 is a view similar to Figure 3, certain parts being replaced, Figure 5 is a view taken on the line 5—5 of Figure 1, Figure 6 is a section on the line 6—6 of Figure 4, Figure 7 is a diagrammatic view illustrating certain optical elements of the invention and the direction of a pencil of light from an object field passed through said optical elements to a photographic film, and—

Figure 8 is an enlarged perspective view illustrating certain of the optical elements and the direction of passage of a pencil of light therethrough.

Referring now with particularity to the drawings, I have shown thereon the completed device for use with a camera for the purpose of photographing an object field by the subtractive method of color photography. Specifically, the said device of this invention contemplates a means adapted to be placed in a suitable lens receiving opening of a turret plate of the type generally employed in motion picture cameras, and without the necessity of change in the turret plate construction. This is a feature of importance because, so far as the inventor is aware, the average camera for taking pictures in color, as a rule, must be radically changed as to mechanism, or a special camera must be built for the taking of color pictures. Any standard motion picture camera may be utilized and, in fact, as was set forth in the objects, the invention, which acts as a "change over" device from an ordinary black and white camera to a color camera, may be utilized in conjunction with any type of "still" camera. The adaptability of the invention to a "still" camera is such as to allow lantern slides to be made from pictures taken by the camera and in such a manner that the lantern slides can be reprojected through suitable filters to recreate, by the additive method, the original colors of the object field photographed.

A distinct advantage of the present invention, as will more fully and at large appear, is in the saving of light afforded by the present device, which allows the taking of color pictures by the subtractive method by a super-speed motion picture camera. Thus, the invention is useful for clinical purposes and particularly for the photographing of an operation, as the resultant picture projected in colors by the additive method will have a color rendition substantially equal to the original color value of the subject photographed, and operative technique may be studied by students or others.

For the purpose of illustrating a possible embodiment of the invention, I have shown in Figures 1 and 2 a side elevation and a top plan, respectively, of an attachment that I may apply to a camera. This invention consists, in its simplest embodiment, of a train of prisms so arranged as to readily transmit a maximum amount of light at full aperture, i. e., without "stopping down" effect, and which prisms are adapted to direct the light pencil or cone of rays of an object field to a lens cell at full aperture of the lens, if desired, with said light pencil after passage through the lens cell equally divided into two parallel light pencils of equal focal length, the passage through the prism train and said lens cell turning the object field through 90° to produce two images of the object field from the same point of view, at the same time geometrically identical, and in side-by-side relationship.

More specifically, reference is had to Figure 7 wherein I have provided a prism train consisting of three right-angled isosceles prisms 1, 2 and 3. Thus, each prism will have a plane incident beam receiving face, as shown, for instance, for the prism 1 at 4, a reflecting face 5, and a plane emergent beam face 6. As it is intended that the light pencil be turned in its passage through the prism train, the prism 2 is so positioned relative to the prism 1 that the sides of both thereof are at right angles; for instance, the side 7 of the prism 1 is at right angles to the side 8 of the prism 2. The prism 3 has its incident beam receiving face against the emergent beam face of the prism 2 and the emergent beam face of the prism 3 is parallel to the incident beam receiving face 4 of the prism 1. While I have described each prism separately, this description has been made for the purpose of clarity, and the contacting faces of the train of prisms are held together through any suitable medium, such as by the use of Canadian balsam. In other words, there is no air space between the different faces of the train of prisms. Therefore, the train of prisms when so interrelated and held together act the same as a prism cut from a single piece of glass, crown glass being used in the present instance.

Owing to the arrangement of the prisms and the variation in size, as will now be described, it is impractical from a manufacturing standpoint, although not an unsurmountable task, to construct the prisms in one piece. The provision of balsam does not induce appreciable aberration, nor does the balsam materially affect the light transmitting property of the prism train, the index of refraction being 1.530.

For the purpose of ease of description, the train or set of prisms 1, 2 and 3 will be designated as an entirety by the numeral 9. It will be noted that the prisms are of different sizes, that is to say, that whereas the incident beam receiving face and the emergent beam face of each prism is of the same area, each contacting prism of the train has a different facial area. Thus, the incident beam receiving face of prism 2 is of lesser area than the emergent beam face 6 of prism 1, and the same is true for the prisms 2 and 3. It will be observed that the arrow 10 represents the object field, and the light pencil from this object field which is, of course, in the form of a cone of rays, is received upon the plane incident beam receiving face 4, as shown at 11. The cone of rays, when received upon the face 4, will subtend a defined area thereon. As this cone of rays or light pencil is reflected by the reflecting face 5 upwardly to the reflecting face 12 of prism 2 and thence to the reflecting face 12 of the prism 3, the cone of light progressively decreases in size, finally emerging from the face 13 of the prism 3.

Again assuming that the prism train constitutes but a single prism, it is apparent that the light cone entering the incident beam receiving face and leaving the emergent beam face, decreases in size and with no "stopping down" effect of said light in the passage through the prism. Thus, the pencil of light or the cone of rays is allowed to move through the prism set in such a manner that the object field is turned 90° without any of the sides of the light cone being intercepted or split. So far as the inventor is aware, prior investigators have attempted to form a prism train adapted to turn an image for various purposes wherein the areas of the emergent beam face and the incident beam receiving face are the same. Such a construction is unsatisfactory as sufficient light cannot pass through the device unless the incident face of the prism set is large enough, and light is absorbed, diffused or otherwise lost or scattered in the device if it contains an excess of glass.

14 designates generally a lens cell comprising any suitable form of lens or lens combinations, the axial ray portion of which is so positioned as to lie in the axis of the light pencil leaving the emergent beam face 13 of prism 3. As previously stated, this invention is adapted to operate in a motion picture camera, and as motion picture camera lenses are of short focal length, the emergent light pencil from the prism set 9 is such as to permit a lens of short focal length to operate at full aperture, if desired.

At 15, I have provided light splitting means of a type adapted to divide the light pencil into two beams having equal optical paths. The means 15 includes the prisms 16, 17 and 18. The prisms 16 and 17 are of equal size and are right-angled isosceles, triangular in form. The oblique faces of said prisms are adapted to be secured together by balsam or otherwise and, in addition, one or both of said oblique faces is adapted to receive a light deposit of silver, or other metallic reflecting means. This silver deposit is such as to allow the path of light to be divided, one path being straight through both said prisms and the other path at right angles to the light pencil entering the prism 17. Thus, the prism set, constituting the two prisms 16 and 17, is positioned on the axis of the lens 14. The prism 18 is off of the axis of the lens 14. This prism is adapted to be cemented or otherwise secured along one face of the prism 17, to-wit, the emergent beam face. The prism 18 is of the truncated rectangular type, the truncated face 19 being parallel to the joined oblique faces of the prisms 16 and 17 and of equal area. It will be noted that the prism 18 is extended as to length in order that the optical light path of the two beams should be equal, as before stated. The character of the glass used for the prism 18 can be varied; for instance, if great length is not desired, flint glass may be used, the prisms 16 and 17 being of crown glass.

The pencil of light divided by the prism set 15 is adapted to be passed through a filter arrangement in such a manner that the divided pencils of light pass through separate filters 20 and 21. The character of the filters is not fixed; however, one filter may be orange-red and the other blue-green. The divided pencils of light, after passage through the filters, are directly projected upon the emulsion of a suitable film 22. I provide, in this instance, a light aperture tray 23 comprising a member provided with spaced apart sides and ends and of a size adapted to overlie the film stock and providing an enclosing area equal to the given panel area which is to receive the light pencils. Further, this tray is provided with a blind 24 which may be substantially intermediate the inner confines of the ends of the tray. Thus, each light pencil bearing color components is separated, a feature of importance when fidelity of color rendition is desired in a projected picture, and likewise necessary when sharp, clear images are desired to be photographed on the said film. It will further be noted that the film 22 is of the motion picture strip type adapted to have a sound track area 25 paralleling the perforated area on one side of the film. It will be seen that the tray or box has one of its ends 26 of greater thickness than the opposite end 27 and that the end 26 overlies the sound track portion. It will, therefore, immediately be seen that the system I have described for the photographing of an object field by the subtractive method of color photography, likewise permits the presence of a sound track on the same film. In Figure 7, the said film 22 is shown as provided with a longitudinal line 28 and spaced parallel transverse lines 29. These lines of course, do not appear on the original film but are indicative of the picture areas. For instance, the actual area that would be covered ordinarily by a picture panel in 35 millimeter stock would be two horizontal spaces, such as shown at 30 and 31. With the present invention, the image of the object field in its passage through the prism sets is such that there will be two identical images of the object field in the spaces 30 and 31, from the same point of view in adjacent parallel relationship. Furthermore, said images are both revolved the same number of degrees from the position of the object field, to the end that the images both have the long axis thereof parallel with the line 28, which is to say, the film images are in diametrically identical edgewise relationship.

It will be seen that the plane incident beam receiving face 4 receives an image 11 of the object field 10, the face acting as an image transmission member, the said image being reflected by the oblique face 5 at substantially 90° to the reflecting face of the prism 2, as shown in Figure 8. As between transmission and reflection, the object field is turned 90° in the same vertical plane as the axis of the image bearing light pencil, and said image is not turned by reflection in the prism 2. The image bearing light pencil is then reflected by the oblique reflecting face 12 of the prism 3 and in so doing, the light pencil is turned 90° relative to the axis of the light pencil originally received on the incident beam receiving face 4 of prism 1. The image bearing light pencil passes through the lens cell 14 which may turn the image bearing light pencil 180°, that is, from the position shown at 30′ to that shown at 31′. The image bearing light pencil 31′ is divided, as before described, no further turning thereof taking place due to passage through said prism set 15.

To commercially utilize the invention just described, I have so arranged the parts, members and features, that the same may be compact and not of appreciably greater dimension than any lens mount carried by a motion picture lens turret. To accomplish this, I have arranged the several elements in the manner depicted in cross section in Figures 5 and 6, the general external view being as shown in Figures 1, 2 and 4.

Referring to Figure 5, the prism set 9 is positioned within the casing generally designated as 32. This casing includes a body casting 33 conforming in outline to the configuration of the prism set 9 when the prism set is in one position, as seen in Figure 3. It will be seen that one wall portion 34 of the casing is angularly related to wall portions 35 and 36, the angularly related portion 34 substantially conforming as to angularity to the angle of the oblique face of the prism 2. The casting is further cut obliquely at 37, this oblique cut substantially corresponding to the angularity of the oblique or reflecting face 5 of the prism 1, see Figure 6. The casting is provided with front and rear cover plates 38 and 39. Both cover plates conform to the general outline of the casting, as best depicted in Figures 3 and 4. In Figure 3, the front cover plate is removed and in Figure 4 the said cover plate is replaced. In this connection, it will be noted that the body casting is provided with one or more screw-threaded openings 40 and the front cover plate has matched openings whereby machine screws or the like may be passed therethrough for engagement with the threads of the openings 40 to hold said cover plate in position. The front cover plate is adapted to have secured thereto an aperture ring 41 in any suitable manner, such as by machine screws 42 passed through openings in the ring and threaded openings in the front cover. This aperture ring has an opening 43 in axial alignment with the aperture opening 44 of the front cover plate. The rear cover plate 39 is provided with an aperture opening 45 facing the emergent beam face 13 of the prism 3. This rear cover plate may be secured to the body casting in the same manner as the front cover plate is secured to the casting, to-wit, by screws, although this construction is not shown. A cover plate 46 extends between the rear cover plate and the body and substantially parallels the reflecting surface 5 of the prism 1, this plate being secured between said plate 39 and the casting in any approved manner.

In order to assure that the prism set 9 does not shift when once positioned within the prism set casing, I have provided means for centering the said prism set. This means includes members 47 and 48. In this connection, the body casting is provided with transverse tap bores in substantial alignment in the sides 35 and 49 thereof and screws engaging said threads have the inner ends thereof bearing against sides of the prism 1, for instance, the side 7 and the side paralleling 7. Lock nuts designated as 50 and 50' secure the screws against movement when the prism has once been positioned. The side 8 of the prism 2 is adapted to have secured thereagainst a compression member 51 which may be formed of cork. It will be observed that certain edge portions of the prism 1 are truncated or beveled, as shown at 52 and 52a. The truncated portion 52 lies in the same plane as the side 53 of the prism 2. When the prism set is to be assembled within its casing, the front cover being removed as illustrated in Figure 3, the compression member 51 extends beyond the plane of the front cover face portion of the body casting, and when the front cover plate is replaced, the inner face thereof will tend to compress the member 51 to cause the truncated portion 52 of prism 1 and the side 53 of the prism 2 to engage the inner face of the rear cover plate. This, together with the adjustment afforded by the members 47 and 48 acts to securely, efficiently, and simply hold the prism set in a fixed position within its casing.

The lens cell 14 which is adapted to have the axis thereof lying in the axis of the light pencil may have the cell portion thereof suitably arranged within a barrel 54. This barrel in turn is adjustably secured within the opening 55 of an eccentric member 56, the eccentric member being provided with one or more transverse threaded bores 57 adapted to receive screws 58 for locking engagement with the lens barrel 54. The eccentric in turn is confined within an annular jacket 59. One end of said jacket is secured to the rear cover plate, the cover plate to this end being provided with a facial annular groove 60 to receive said end portion of the jacket. Any suitable means may be provided for securing the jacket within the groove, such as by welding, pressed-fit engagement, or the like. Adapted to be secured to the jacket is one member 61 of a pair of focusing sleeves 61 and 62. The focusing sleeve 61 is provided with internal screw-threads 63 adapted to engage external threads 64 of the sleeve 62. The sleeve 61 is provided with an annular flange 65 and this flange in turn is provided with an annular shoulder 66. A divided ring 67 fits against the flange 65 and within the confines of the shoulder 66, being secured to said flange by screws or other means 68. The jacket 59 is provided with an annular groove 69 and the divided ring is received within said groove. It will be observed that the inner surface of the focusing sleeve 62 is adapted to slide telescopically upon the periphery of the jacket 59. The inner surface of the sleeve 62 is provided with one or more longitudinally extending tongues 70 and the jacket 59 is provided with one or more grooves 71 adapted to receive said tongues. Thus, if the focusing sleeve 62 is held and the sleeve 61 rotated, the jacket which is secured to the sleeve 61 will be moved relative to the sleeve 62. Inasmuch as the lens barrel is held fast within the eccentric 56 and the jacket secured to the eccentric, all of these members aforesaid will move with the sleeve 61 the same distance relative to the sleeve 62. The jacket, eccentric and lens barrel are not rotated by turning the sleeve 61 for the reason that the focusing sleeves are in tongue and groove relationship. It is obvious that the screw-threaded engagement between the focusing sleeves constitutes one form of micrometer adjustment. The periphery of the annular flange 65 may be knurled, if desired, to aid in permitting focusing adjustment, see Figures 1 and 2.

The sleeve 62 carries a prism set mount 72 for the prism set 15. This mount is formed with a shoulder portion 73 and with a flange 74. The sleeve 62 at one end in part receives said mount and bears against the shoulder 73, see Figure 5. The said prism set 15 in turn is confined within a rectangular opening 75 of the mount. Any suitable means may be employed for securing the prism set within the opening 75, together with suitable means for securing the said prism mount within said sleeve 62. The correct positioning for the prism mount relative to the prism set 9 is that illustrated in Figure 5.

The sleeve 62 is provided with an annular flange 76 having transverse bores whereby mounting screws passed through said bores may secure the said flange, together with the remaining portions of the device, within the lens sleeve receiving opening 77 of a lens turret plate 78.

The front plate of the camera frame is shown at 79 and, in Figure 5, the lens turret has been turned so as to position the present invention within the photographic aperture 80 of the frame. Secured forwardly of the shutter 84 of the camera are the color filters 20 and 21. Rearwardly of said shutter is positioned the aperture tray 23 immediately followed by the film 22.

79 indicates a portion of the camera frame. Ordinarily, a camera frame consists of a main frame and turret plate mount, turret plate and a door. However, some manufacturers so arrange the camera construction that the camera mechanism contained within a housing may be withdrawn from the frame, and this latter type of camera is the one depicted in Figure 5, wherein the said frame, and particularly what is sometimes termed the front L, is provided with an aperture 80. This aperture is adapted to be in alignment with one of the apertures of the turret plate, and, in the present instance, it will be noted that the prism set 15 is forward of and in part received within the aperture. Upon the inner surface of the frame 79 and at the zone of said aperture 80, I have positioned the filter set 20 and 21, the filter set to this end being secured to a thin plate 81, which plate may be received within suitable grooves 82 between the frame and a portion of the body adapted to house the camera mechanism, which as before stated may be removed from the frame. This mechanism body, as it may be termed, is provided with an aperture 83 in alignment with the aperture 80 and within this aperture is adapted to be positioned the aperture tray 23. Included between the aperture tray and filter set is a shutter 84. The film 22 is immediately rearward of the aperture tray and in engagement with the film is the usual pressure plate 85 provided with one or more rollers 86 adapted to bear against the film. The shuttle mechanism is not shown.

The reflecting surfaces of each of the prisms 40 of the prism set 9 have a silver deposit thereon and the oblique reflecting face 19 of the prism set 15 is also silvered. The absorption of light by the silver is comparatively small and assures that the pencil of light will be totally reflected in passing through the different prisms of the set 9.

The operation, uses and advantages of the invention, it is thought, have been sufficiently detailed in the statement of the objects, together with the description as given, but it may be stated briefly that, having selected the object field, it is possible, through the use of the invention, to photograph said object field on a film so as to produce two parallel images, each of a different color selection value, the photographed images being in black and white, which, of course, includes gradations of the black, such as the grays. The lens is, of course, accurately focused with respect to the prism set 9 and therefore in focusing the lens, the combined prism set 9 and the lens are moved simultaneously through the medium of the focusing sleeves which will cause relative separation, in one instance, or approach between the prism set 15 and the said lens. It is, of course, understood that those skilled in the art will be able to properly focus the lens relative to the different prism sets and the object field to be photographed, taking into consideration the interposition of the filters forward of the film. The presence of the filters introduces slight change in focus. The presence of the aperture tray assures that the two paths of light upon emergence from the prism set 15 and passage through the filters will be maintained separated to overcome what may be termed a "fringing" effect due to color interference along the adjacent marginal portions of the divided light pencil. Thus, both images on the film are sharply defined without bounding contiguous edges of the image area in any manner showing gradations in color selection partaking of the nature of the combined colors which theoretically in combination could only produce a well defined negative having no color selection at the areas mentioned aforesaid. For the reason mentioned, a projected picture by the additive method would not be clearly defined at certain portions thereof and might appear in shades of gray at certain areas thereof.

While I have shown the present invention as adapted to be secured to a turret plate and in the manner shown, still it is apparent that the prism set 15 may be modified in such a manner as to permit the lens turret to be revolved, revolution of the lens turret being impossible in the showing of Figure 5. Furthermore, light dividing prisms of the character indicated at 15 are well known in the art, and I do not wish to restrict my invention to this particular type of light dividing prism as others may be employed. It is essential, of course, to provide some light dividing means in practicing the present invention. The construction of the device as exteriorly shown in Figures 1 and 2, is such as to render the device attractive in appearance and sturdy of construction. It will be noted upon reference to Figure 5 that the several elements and parts are readily combined to provide rigidity of structure. This rigidity is a necessary feature as accuracy of adjustment between the different elements, such as the prism sets 9 and 15, with the interposed lens, must at all times be maintained. For instance, the axis of the light pencil through the prism set 9 must exactly coincide with the lens axis, it being evident that offsetting might produce error.

Another feature of importance is the adjustment allowed the prism set 9 through the medium of the adjusting screws 47 and 48. This permits an operator to assure that the axis of the light pencil passed through the prism set 9 coincides with the axis of the lens. Thus, if the device should be struck or dropped accidentally, it will be possible to immediately check the accuracy of passage of the light pencil therethrough and if adjustment is necessary, this adjustment may be readily accomplished in one instance by adjusting the prism set 9, and in a second instance, the focusing sleeve 61 might be totally unscrewed from the focusing sleeve 62 to permit adjustment of the lens relative to the plane emergent beam face of the prism 3.

The invention is adaptable for any size film in addition to the 35 millimeter mentioned, such as 16 millimeter, "grandeur", etc.

It is obvious that various changes and modifications and variations may be made in practicing the invention in departure from the particular description as given and the disclosure in the drawings without, however, departing from the true spirit of the invention as defined by the scope of the appended claims.

I claim:
1. A device of the kind described comprising an optical system that includes in order a series of prisms for turning a light beam and the image carried by it on its side, an objective for focusing the image, and a light splitting device for dividing the light beam to produce a plurality of images; a cylindrical shell eccentrically bored, the objective being mounted in the bore, and a frame supporting the elements of the optical system and including a portion supporting the cylindrical shell for rotation about an axis parallel to the axis of the system.

2. A device of the kind described comprising an optical system that includes in order a series of prisms for turning a light beam and the image carried by it on its side, an objective for focusing the image, and a light splitting device for dividing the light beam to produce a plurality of images; a frame for supporting the elements of the optical system, said frame being formed in two adjustably connected parts, one carrying the prisms and objective and the other the light splitting device and means for moving one of said parts relative to the other in the direction of the general axis of the system.

3. A device as described in claim 2 in which the two parts of the frame comprise telescoping tubes, one of which carries the light splitting device and the other of which carries the objective and the prisms.

4. A device as described in claim 2 in which the two parts of the frame comprise telescoping tubes, one of which carries the light splitting device and the other of which carries the objective and the prisms, and the means for moving one of the parts comprises a threaded collar rotatably mounted on one part and cooperating with threads on the other part of the frame.

5. An attachment for converting an ordinary motion picture camera into a camera for taking color pictures that comprises a tube adapted to replace the lens tube of the camera, a prism set at the outer end of said tube having a face through which light to form an image is received and a face through which the light is passed into the tube, each of said faces lying substantially perpendicular to the direction of the light passing therethrough to the camera and said prism set also having a plurality of faces for reflecting the light within it and revolving the image through ninety degrees, said prism set comprising a series of prisms of progressively smaller size toward the inner end of the set, an objective within the tube, a prism system also within the tube receiving light from the objective and arranged to split the light into two like beams.

OTTO C. GILMORE.